J. D. HANDBURY.
VEHICLE WHEEL RIM.
APPLICATION FILED APR. 12, 1917.

1,272,429.

Patented July 16, 1918.

INVENTOR.
John D. Handbury
By Louis C. Vanderlip
his attorney.

UNITED STATES PATENT OFFICE.

JOHN D. HANDBURY, OF GOSHEN, INDIANA.

VEHICLE-WHEEL RIM.

1,272,429.   Specification of Letters Patent.   Patented July 16, 1918.

Application filed April 12, 1917. Serial No. 161,415.

*To all whom it may concern:*

Be it known that I, JOHN D. HANDBURY, a citizen of the United States, residing at Goshen, county of Elkhart, and State of Indiana, have invented certain new and useful Improvements in Vehicle-Wheel Rims, of which the following is a specification.

My invention relates to demountable rims for automobile wheels in which the vehicle wheel has a removable tire carrying rim adapted to be removed from the felly or fixed wheel rim, in combination with improved means for operatively locking the tire carrying rim upon the felly or fixed rim.

An object of my invention is the production of a demountable tire carrying rim having simple, cheap and effective means for locking it against lateral displacement from the felly, or fixed rim, as well as simple, cheap and effective means for confining the movable tire carrying rim against circumferential movement on the felly or fixed rim of the wheel.

Figure 1:
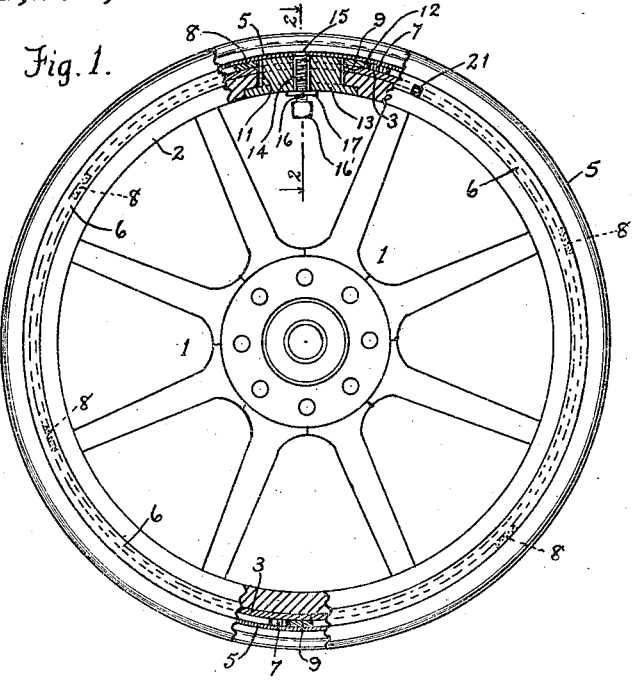
Figure 2:
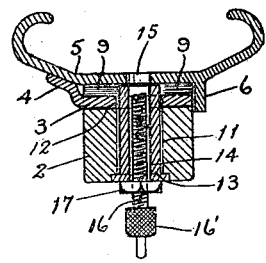
Figure 3:
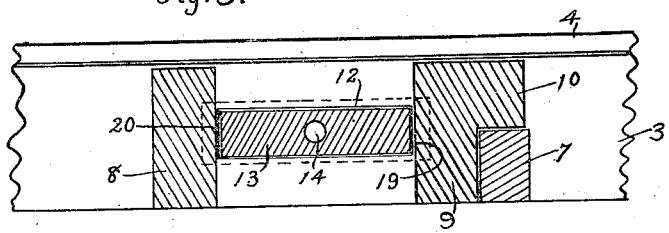
Figure 4:
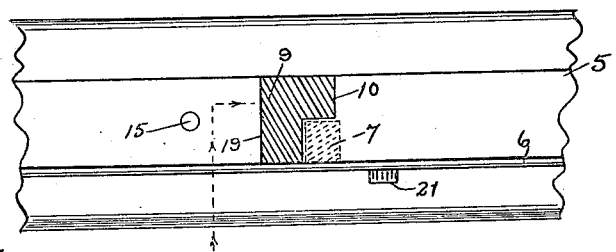
Figure 5:
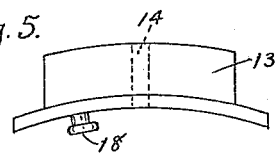

The preferred embodiment of my invention is well illustrated in the accompanying drawings, in which Figure 1 is a side elevation of a wheel equipped with my demountable rim improvements; Fig. 2 is a section taken on the line 2—2 of Fig. 1; Fig. 3 is a top plan view of Fig. 2 with the tire carrying rim not shown but disclosing the confining lug secured to the demountable rim, as well as the confining and stop and traction lugs rigidly secured to the fixed wheel rim; Fig. 4 is a plan view of the under side, or inner periphery, of the demountable tire carrying rim, confining lug secured thereto, and other members; Fig. 5 is a side elevation of the locking key.

Similar numerals refer to similar members and parts of members throughout the several views on the drawings.

Referring to the drawings in detail, the numeral 1 indicates a vehicle wheel having a felly 2 upon which is rigidly secured the endless fixed rim 3, the latter being provided with the integral flange 4 on its inside edge to limit the movement of the demountable tire carrying rim, hereinafter described.

The numeral 5 indicates a demountable tire carrying rim of the clencher type having an endless, imperforate inwardly projecting flange 6 formed integral therewith adjacent the outer edge thereof for the purpose of excluding mud, sand, and other substances, from beneath the rim when it is mounted upon the wheel. The numerals 7, 7 indicate a plurality of traction lugs rigidly fastened to the outer periphery of the fixed rim 3 and extending from the outer edge thereof to a point intermediate its outer and inside edges, or substantially to the longitudinal center line thereof. The numerals 8, 8 indicate a plurality of rim carrier straps extending transversely of and rigidly fastened to the outer periphery of, the fixed rim 3 and adapted to support the demountable rim 5 when the latter is mounted upon the wheel. The numerals 9, 9 indicate a plurality of traction lugs of L formation rigidly fastened to the inner periphery of the demountable rim 5, each lug being provided with a longitudinal extension 10 which is adapted to be arranged between the lug 7 and the fixed rim flange 4 to prevent lateral displacement of the rim 5 from the fixed rim 3. The numeral 11 indicates an elongated key aperture formed longitudinally of and in the felly 2 and extending from the inner periphery to the outer periphery thereof and registering with an elongated opening 12 formed in the fixed rim 3. The numeral 13 indicates an elongated key member removably arranged in the felly opening 11 and projecting radially through the opening 12 into light contact with the inner periphery of the demountable rim 5, or slightly spaced therefrom. The key 13 is provided with an aperture 14 adapted to register with the aperture 15 in the demountable rim 5, both of which apertures are adapted to contain and be penetrated by the air valve stem 16 which is adapted to be connected at its outer end with the inner or air container tube of the pneumatic tire in the usual manner, said valve stem having a removable cap 16' of the usual or any type. The numeral 17 indicates a lock washer which is screw threaded upon the valve stem 16 and adapted to be screwed down upon the key member 13 to maintain the latter within its receptacle, the aperture 11, and with its outer end projecting through the aperture 12 of the rim 3. The outer periphery of the key member 13 is preferably concentric with the inner periphery of the demountable rim 5. The numeral 18 indicates a boss carried on the key 13 to enable manipulation thereof.

In operation, the rim 5 carrying the lugs 9, 9, is slid transversely of and upon the fixed rim 3 until the flange 4 is engaged thereby. Thereupon, the rim 5 is moved circumferentially of the rim 3 until the lugs 9, 9 engage lugs 7, 7 and the longitudinal extension 10 of the lug 9 is arranged between said lug 7 and the flange 4, as indicated in Fig. 3, whereby lateral displacement of the rim 5 is prevented.

The opposite ends of the opening 12 formed in the fixed rim 3 lie substantially in the same plane as the end walls 19 and 20 of the lugs 9 and 8, respectively, and are substantially parallel with the end walls of the key member 13, the latter occupying the opening 12 with as little play as possible to facilitate ready manual movement thereof. It is evident, when the key member 13 is in position, that it forms an abutment for the lug 9 positioned adjacent thereto when the rim 5 is mounted as described, whereby circumferential movement of the rim 5 along rim 3 is effectually prevented.

The numeral 21 indicates a lug or boss carried on the outer periphery of the rim flange 6 to which a tool or implement may be applied for circumferentially moving the lug extension 10 of lug 9 out of engagement with the lug 7, or the reverse.

I claim:

The combination of a fixed felly rim provided with an elongated key aperture; a plurality of stop lugs rigidly fastened to said fixed rim; a demountable tire carrying rim provided on its inner periphery with a plurality of L shaped lugs adapted to engage said stop lugs for preventing lateral movement of said demountable rim, one of said lugs having one edge flush with one end wall of said elongated key aperture; an endless inwardly projecting flange carried by said demountable rim and covering said lugs and said fixed felly rim; and an elongated key member removably arranged within said elongated key aperture in said fixed felly rim, said key end engaging said L shaped lug having its edge flush with the end wall of said aperture and serving as an abutment thereto, whereby circumferential movement of said demountable rim is prevented.

In testimony whereof I have hereunto affixed my signature this 31st day of March, 1917.

JOHN D. HANDBURY.

Copies of this patent may be obtained for five cents each, by addressing the "Commissioner of Patents, Washington, D. C."